United States Patent [19]

Wills

[11] Patent Number: 5,542,731
[45] Date of Patent: Aug. 6, 1996

[54] CARRIER FOR STACKED PLATES

[76] Inventor: Joan F. Wills, 07681 Highway 126, Florence, Oreg. 97439

[21] Appl. No.: 450,419

[22] Filed: May 25, 1995

[51] Int. Cl.⁶ .................................................. A47G 19/08
[52] U.S. Cl. ........................... 294/161; 294/169; 211/41; 211/85
[58] Field of Search ....................... 294/161, 167, 294/169, 27.1, 28, 29, 31.1, 143, 144; 211/41, 71, 85, 195, 201, 203

[56] References Cited

U.S. PATENT DOCUMENTS

| 152,550 | 6/1874 | Collins . | |
|---|---|---|---|
| 481,404 | 8/1892 | Jesser | 294/161 |
| 948,524 | 2/1910 | Reid | 294/144 |
| 2,845,183 | 7/1958 | Paulsen | 211/41 |
| 3,251,521 | 5/1966 | Fay | 294/161 |
| 3,259,416 | 7/1966 | Mannisi | 294/167 |
| 4,329,789 | 5/1982 | Erickson | 294/161 |

FOREIGN PATENT DOCUMENTS

| 451651 | 6/1950 | Italy | 294/161 |

*Primary Examiner*—Dean Kramer
*Attorney, Agent, or Firm*—James D. Givnan, Jr.

[57] ABSTRACT

Multiple leg members have upright and horizontal segments with the former defining openings to receive the rims of plates being carried. A combination handle and retainer prevents closing movement of the leg members during use of the carrier. Ears on the underside of the handle prevent closing movement of the leg members. Loosening of a fastener assembly permits disengagement of the ears from some of the leg members to permit rotation of the leg members toward a remaining leg member to collapse the carrier for storage.

3 Claims, 1 Drawing Sheet

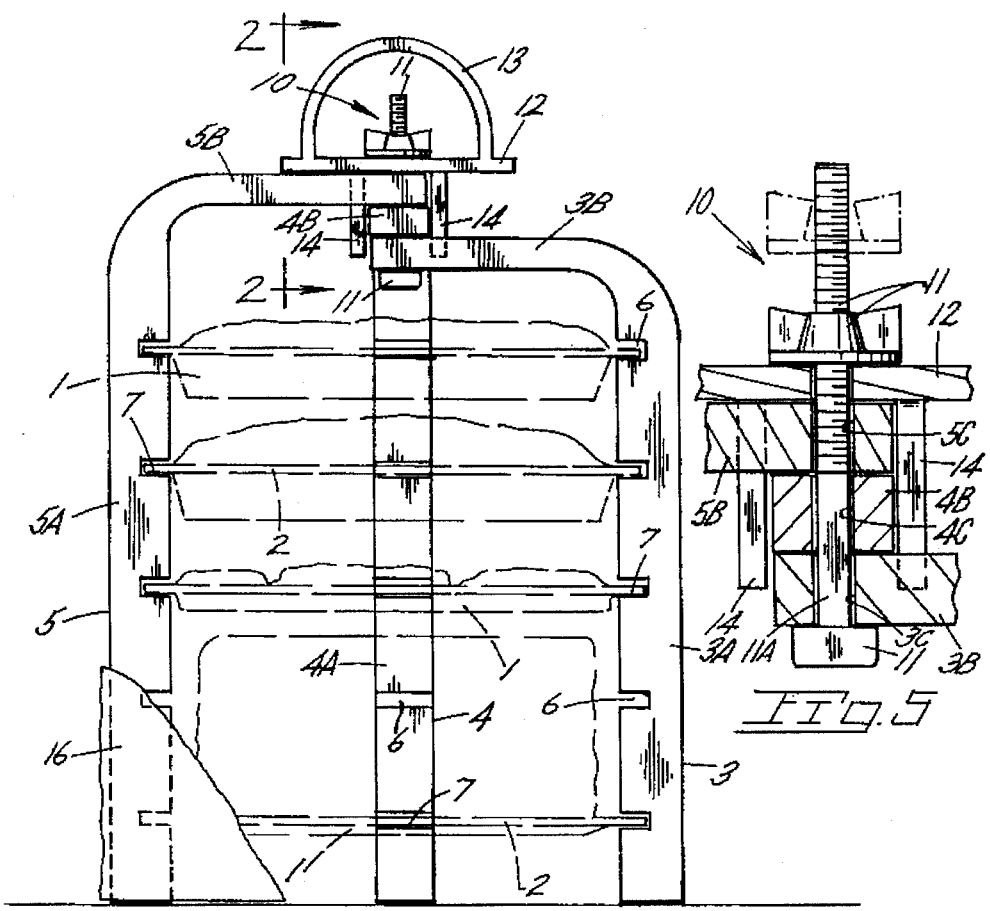
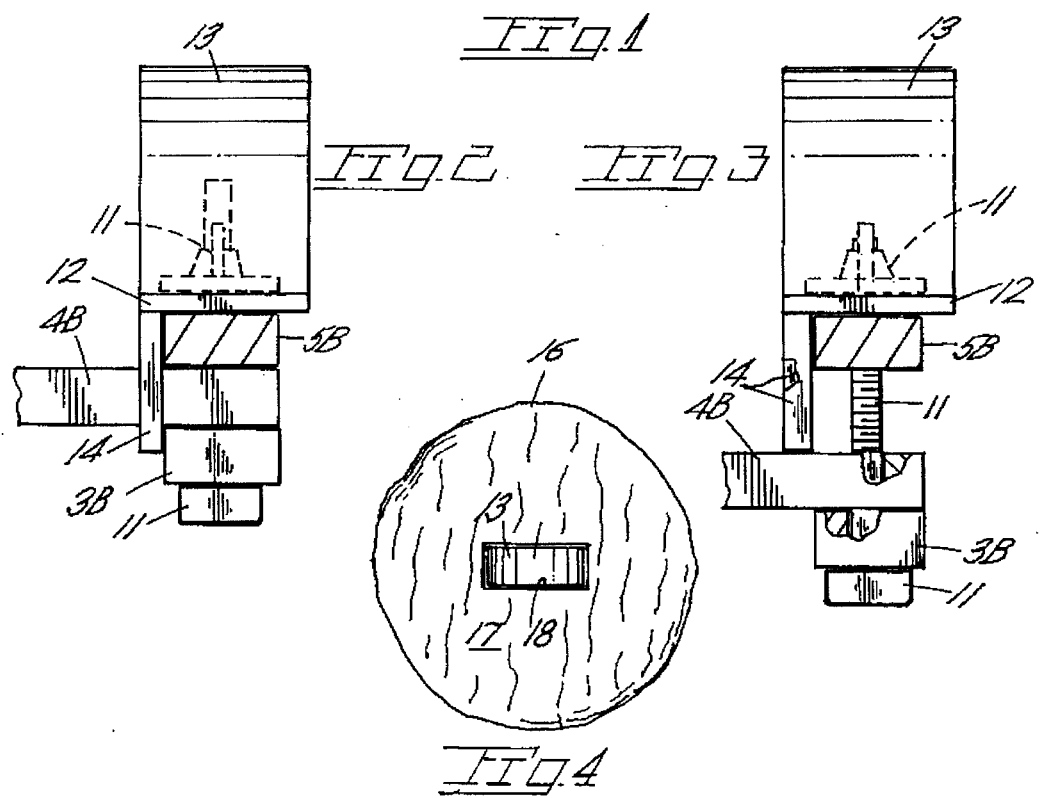

5,542,731

CARRIER FOR STACKED PLATES

BACKGROUND OF THE INVENTION

The present invention concerns a device for transporting and storing several vertically spaced apart plates.

A problem exists in the transportation of pie plates as such must be supported in a spaced manner isolated from contact with one another and from the carrier to avoid damage to the fragile articles.

While pie racks have been the subject of earlier patents, e.g., U.S. Pat. Nos. 2,845,183 and 152,550, such racks, of wire construction, do not permit carrying in a convenient and safe manner nor compact storage in a drawer when not in use. The former patent discloses a cover of bag configuration having an upper end closed by a clamp.

SUMMARY OF THE PRESENT INVENTION

The present invention is embodied in a collapsible rack for supporting pie plates and the like in an isolated, spaced manner for carrying of same without risk of damage or accidental loss from the rack.

The present rack includes upright leg members grooved to receive pie plate rims or other plate rims with the leg members held in place by a handle with leg retainers which prevent leg movement about a rack pivot. Extensions on the handle are of a bifurcated shape to confine the legs in place to provide a tripod type rack with goods accessible for easy removal. A cylindrical cover ensures rack retention of the pie plates or other like items carried by the rack as the cover is in close fitting engagement with the rack leg member and prevents therewith any displacement of the goods during transport. The handle is positionable relative the leg members to enable the latter to swing about an upright axis of the pivot to collapse the leg members for storage in a small area such as a drawer.

Important objectives include the provision of a plate carrier suitable for transporting pies and other goods which are confined in place by angular leg members being collapsible about a centrally located pivot for the purpose of carrier storage; the provision of a carrier for plates or other like articles and having multiple legs each with a horizontal segment the ends of which are overlapped to receive pivot means and a handle with downward extensions for locking the leg members against pivotal movement; the provision of a plate carrier having a cylindrical cover to protect the plates from displacement during transport.

BRIEF DESCRIPTION OF THE DRAWINGS

In the drawings:

FIG. 1 is a front elevational view of the present plate carrier;

FIG. 2 is a vertical sectional view taken along line 2—2 of FIG. 1;

FIG. 3 is a view similar to FIG. 2 but with the horizontal leg segments positioned prior to arcuate positioning to a collapsed configuration; and FIG. 4 is a plan view of FIG. 1 on a reduced scale and with a carrier cover shown in full line; and FIG. 5 is an enlarged fragmentary view of carrier pivot means.

DETAILED DESCRIPTION OF THE PREFERRED EMBODIMENTS

With continuing attention to the drawings, the applied reference numeral 1 indicates circular plate shaped containers such as pie plates, cake plates or dinner plates each having a rim 2.

The present carrier includes leg members 3, 4 and 5 with vertical segments 3A, 4A and 5A and horizontal segments 3B, 4B and 5B. The vertical segments define open areas 6 with leg surfaces 7 partially defining the areas and serving to support a plate rim 2. The leg members, when operatively disposed, provide a carrier with three leg members spaced at approximately ninety degrees about later described pivot means.

Overlapped ends of the leg members have openings therein at 3C, 4C and 5C to receive a fastener assembly 11 of carrier pivot means generally at 10. Openings 3C and 4C are square while opening 5C is round so leg 5 may swing somewhat beyond ninety degrees for carrier stability. Threaded fastener assembly 11 has a square segment at 11A.

A combination handle and retainer 12 for said leg members includes a bail or handle 13 having rearwardly offset downward extensions or ears at 14 to retain the leg members against closing movement about said pivot means.

When operatively disposed the legs are held in place as shown in FIGS. 1 and 2 with fastener assembly 11 urging the horizontal segments 3B,4B upwardly alongside extensions 14. For repositioning the leg members into a folded or collapsed relationship for storage purposes, fastener assembly 11 is loosened to the extent horizontal segments 3B-4B are lowered, per FIG. 3 below extensions 14 whereafter the leg members may be swung to provide the desired configuration.

A cover 16 is of cylindrical shape with a top portion 17 defining an opening 18 to receive handle 13 of the combination handle and retainer 12. The cover is of a size and shape to closely overlay the horizontal and vertical segments of leg members 3, 4 and 5 and also an arcuate portion of plate rims 2 in place in the carrier to prevent plate separation from the leg members.

In use the leg members are swung apart about pivot means 10 with leg members 3 and 5 located somewhat beyond 90 degrees from the remaining leg members. The articles to be carried are inserted onto the leg members subsequent to tightening of fastener assembly 11. With cover 16 in place the carrier is ready for travel without risk of article dislodgment. Article removal at the point of use entails only removal of the cover as adequate clearance will most likely exist between the slotted leg members and the plate rims 2 during plate removal. Upon emptying of the carrier the fastener assembly is loosened to permit arcuate repositioning of the leg members toward one another. When transported the ears or extensions 14 prevent closing movement of the leg members.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A carrier for stacked plates comprising, leg members of angular configuration having upright and horizontal segments, multiple plate receiving openings defined by each of said upright segments, said horizontal segments having overlapped portions, pivot means passing through said overlapped portions of said horizontal segments, and a combination handle and retainer for said leg members including a bail and having downward extensions normally disposed in contact with said horizontal leg segments to confine same against rotational movement about said pivot means to retain the leg members in an operable spaced apart relationship.

2. The carrier claimed in claim 1 additionally including a cover for superimposed placement on said upright and horizontal segments of said leg members, said cover being of cylindrical shape and having a top closure defining an opening to receive said combination handle and retainer.

3. The carrier claimed in claim 1 wherein said pivot means extends through said handle and includes an adjustable elongate fastener of a length to permit upward displacement of said extensions away from contact with said horizontal segments to permit rotational movement of the leg members for collapsing of same toward one another.

* * * * *